United States Patent [19]

Mitchell et al.

[11] 4,143,172

[45] * Mar. 6, 1979

[54] FOOD BINDING AGENT

[75] Inventors: John R. Mitchell, East Leake; Keith Buckley, Mowbray; Ian E. Burrows, Gaddesby, all of England

[73] Assignee: Mars Limited, London, England

[*] Notice: The portion of the term of this patent subsequent to Sep. 21, 1993, has been disclaimed.

[21] Appl. No.: 619,179

[22] Filed: Oct. 3, 1975

[30] Foreign Application Priority Data

Oct. 8, 1974 [GB] United Kingdom ............... 43500/74

[51] Int. Cl.$^2$ .................... A23G 9/00; A23L 1/04; A23L 1/31; A23C 23/00
[52] U.S. Cl. .................... 426/532; 426/565; 426/574; 426/577; 426/588; 426/646; 426/660; 426/805
[58] Field of Search ............... 426/567, 574, 577, 580, 426/583, 646, 656, 657, 802, 805, 100, 332, 532, 588

[56] References Cited

U.S. PATENT DOCUMENTS

| | | | |
|---|---|---|---|
| 2,132,065 | 10/1938 | Wilson | 426/577 X |
| 2,938,796 | 5/1960 | Zick | 426/574 |
| 3,409,443 | 11/1968 | Polya et al. | 426/577 X |
| 3,493,394 | 2/1970 | Eldridge et al. | 426/577 |
| 3,729,322 | 4/1973 | Clavert | 426/583 X |
| 3,736,148 | 5/1973 | Katz | 426/802 X |
| 3,982,003 | 9/1976 | Mitchell et al. | 426/574 |

OTHER PUBLICATIONS

Baier et al, *Industrial and Engineering Chemistry*, vol. 33, Mar., 1941, pp. 287-291.

*Primary Examiner*—Robert A. Yoncoskie
*Assistant Examiner*—E. M. Kepplinger
*Attorney, Agent, or Firm*—Davis, Hoxie, Faithfull & Hapgood

[57] ABSTRACT

The invention relates to food products having a gelled or thickened aqueous phase, a pH value of 2.5 up to 5.0 and in the case of milk products up to the neutral range about 7.5. Applicants have found unexpected benefit in using crude pectinaceous material of which the degree of esterification is or has been reduced to less than 20%, and preferably less than 10%, as the thickening or gelling agent in such products. Gel strength measurements show that comparable gels are formed with much lower pectin concentrations when the crude material is used than when purified or extracted pectin is employed. Gel structures are better and there is an outstanding cost advantage. Products contain from 0.1 to 20% crude pectinaceous material such as comminuted citrus peel. They may contain comminuted animal or vegetable protein or fruit puree or other flavoring at a pH of 2.5 to 5.0. Alternatively they may contain milk or milk derivatives, for example, from 2 to 60% milk solids and may have an acidic pH in the case of yoghurts or a pH up to about 7.5 in the case of ice cream, desserts or other milk products.

8 Claims, No Drawings

FOOD BINDING AGENT

The present invention relates to the preparation of food products, both for human and for animal consumption, having a thickened or gelled aqueous phase.

More particularly, the invention relates improved food products having a gelled or thickened aqueous phase with a pH value of 2.5 up to 5.0 or, in the case of milk-based products, up to the neutral region.

We have now found that if a naturally occurring crude pectinaceous material, in which the degree of esterification (D.E.) of the pectin content is or has been reduced to below 20%, is employed as gelling agent levels of thickening or gel strengths can be achieved which are substantially higher than those obtained by the use of an equivalent amount (calculated on a galacturonic acid basis) of extracted or purified pectin. The D.E. of the crude material employed is preferably 10% or less.

By the term "crude pectinaceous material" we mean natural sources of pectin which have not passed through purification procedures to separate the pectin from its cellulosic matrix. Consequently these materials on a dry basis contain only some 5–45% of pectic acid (expressed as galacturonic acid), typically 25–30%, the remainder being composed of cellulosic materials, soluble sugars and mineral salts.

The gelling behaviour of pectic substances depends critically on the proportion of the galacturonic acid residues which are methoxylated. In a completely esterified material esterified with methoxyl groups, i.e. with a degree of esterification (D.E.) of 100%, the methoxyl content by weight is about 15%. Currently available commercial pectins used for gelling applications can be divided into two classes:

1. High methoxyl pectins with a D.E. above 50%, which form gels of the traditional jam type. Pectins of this type will only form gels at pH values below 3.5 and in the presence of substances which are believed to act to dehydrate the pectin molecule. Levels of sugar above 60% are generally employed for this function though the materials such as alcohol or glycerol could be used. High methoxyl pectins are primarily employed as gelling agents in preserves and confectionery foodstuffs.
2. So-called low methoxyl pectins in which usually between 20 and 40 percent of the galacturonic acid residues are esterified. Pectins of this type can form gels over a wider range of pH values in the absence of sugar but require the presence of divalent alkaline earth ions. They have greatest stability in the pH region 4.0–4.5 especially when the pectin gel is subjected to heat treatment (see British Pat. No. 814,549). Low methoxyl pectins have been employed as gelling agents in food products such as dietectic jams and fruit milk desserts. Commercial low methoxyl pectins are generally prepared from high methoxyl pectins either by treatment with acids over a very long period of time or by the action of ammonia in alcoholic systems. In the latter case the resultant pectin product will contain some galacturonic acid residues in which the carboxyl groups have been amidated.

In nature, pectin occurs as a highly esterified pectic acid which is believed to be associated in a "protopectin" configuration with a cellulosic matrix through calcium linkages. The pectin in its natural state can be de-esterified without separation from its cellulosic matrix by the methods described below and we have found that in this form it surprisingly performs much more effectively than the purified, separated pectin.

The reasons for its improved performance may be related to the higher molecular weight of the pectin in its native state or to its inter-relationship with the cellulose matrix. Whatever the reason, it has been found that when the crude protopectin source of low D.E. is dispersed with salts such as sodium citrate, potassium carbonate or sodium tripolyphosphate, the resultant dispersion shows better functional properties than purified pectins.

The crude pectinaceous materials useful for the purposes of this invention include a wide variety of abundant and cheap materials such as apple, citrus or sugar beet residues, which have been subjected where necessary to de-esterification, e.g. by alkali or enzymes, to reduce their D.E. to below 20%. Usually, natural pectic substances will have to be deliberately de-esterified, for example by alkaline hydrolysis or by an enzyme such as pectinesterase. However, deliberate de-esterification may not be necessary if a natural protopectin source is used having a D.E. below 20%, for example because the source contains pectinesterase. Moreover, if the source contains such an enzyme the mere act of macerating the source material or adding it to a substantially neutral medium prior to pasteurization or sterilization may cause a reduction in the D.E. sufficient for the purposes of this invention.

Thus if orange peel is ground to a small particle size, preferably neutralized to pH 7–8 with an alkali such as sodium carbonate, for example over a period of 30 minutes, washed to remove sugars and objectionable soluble compounds and dried, the ground product may be employed as a thickening and gelation agent in canned foods. Since the majority of the orange aromatic constituents and colour lies in the surface layer of the peel (the flavedo) it is desirable when using the treated peel to thicken or gel products such as meat or fish that the flavedo be removed prior to processing, thus leaving the less characteristically flavoured albedo. Shaving techniques for removing the orange flavedo from the crushed orange halves are well reported in the literature.

The reaction mechanisms by which the protopectin in the peel is converted into a gelling agent is not well understood. However, although this invention does not depend on any theory for its performance, one possible explanation is that enzymes liberated during the grinding of the orange peel at least partially demethoxylate the pectin molecule, which is thought to be linked to hemicelluloses and other materials in the protopectin configuration, and that on subsequent treatment in a substantially neutral medium further demethoxylation and solubilisation of the pectin may occur. We believe that the resulting pectate then reacts with alkaline earth ions in the food product to form a thickened or gelled system.

It will be appreciated that any hydrolysis or other treatment of the pectic substance should not cause excessive reduction of its molecular weight, since this impairs its gelling and thickening qualities. We believe that if the de-esterification has been accomplished with an enzyme the results characteristic of this invention can be achieved with a higher D.E. than if de-esterification is accomplished by other means, presumably as a result of the sequential nature of this type of hydrolysis as opposed to the random removal of methoxyl groups along the chain when acid or alkali hydrolysis is employed. This is especially noticeable with more severe heat treatments, as in the retorting of canned products, and it may be surmised that the extent of depolymerisation of the pectate under these conditions is less in the case of enzyme de-esterified material.

Determination of the degree of esterification may be carried out by the measurement of the methoxyl content of the material and measurement of its galacturonic acid content. Although a modification of Hinton's saponification procedure is commonly employed to measure methoxyl content of high methoxyl pectins we have found this technique can produce inaccurate results when the samples under examination are crude pectinaceous sources, presumably as a result of interaction with other components of the source material, such as protein.

We have used both the modified saponification method and a more specific procedure based on gas solid chromatography along the lines suggested by Krop et al. (Lebensm. — Wiss.u.Technol, vol. 7, 1974, no. 1). Both methods have produced similar results for crude protopectin sources of low methoxyl content.

MODIFIED SAPONIFICATION METHOD

A sufficient sample of finely ground dried material usually 2 g., to release a maximum of 0.02 g. methanol) is stirred with 250 ml water and heated on a boiling water bath for 20 minutes with occasional stirring after which the mixture is macerated with a high speed stirrer. The dispersion is cooled to 20° C. and neutralised to pH 8.4 using a pH electrode to detect the end point, and N/10 sodium hydroxide to effect the neutralisation. 20.00 Ml of N/10 NaOH is then added and, after stirring, allowed to stand for 20 minutes. 20.00 Ml N/10 HCl is added and the excess HCl estimated by titration with N/10 sodium hydroxide solution to a pH 8.4 endpoint using a pH electrode to detect the end point. Titre = B ml.

$$\% \text{ methoxyl} = \frac{B \times 0.3104}{\text{Weight of sample}}$$

GSC METHOD

2 G. of finely ground dried material is stirred with 100 ml water and heated on a boiling water bath for 20 minutes with occasional stirring, after which the mixture is macerated in a high speed stirrer. The dispersion is cooled to 20° C. and 20 ml of a 1N sodium hydroxide solution is added with stirring. After 20 minutes at 20° C., 5 ml of 50% concentrated hydrochloric acid is stirred in and quantitatively made up to 200 ml with distilled water. The dispersion is allowed to stand for 10 minutes for the precipitate to settle.

The methanol content of the supernatant liquid is then determined gas-chromatographically using a similar condition to that described by Krop et al. (loc. cit.).

The galacturonic acid content of the sample is measured by repeating the procedure described above up to and including the stage of standing for 20 minutes with 1N sodium hydroxide after which 20 ml of concentrated hydrochloric acid is added with stirring. 800 Ml of propan-2-ol is added and the dispersion allowed to stand for 30 minutes.

The precipitated solid is filtered off on a Buchner funnel and washed thoroughly with 60% by volume propan-2-ol in water. The solid is then dispersed in water, 10.0 ml 0.1N sodium hydroxide is added and the solid dispersed using a high speed mixer. The dispersion is titrated to pH 8.4 with 0.1N sodium hydroxide using a pH meter (Titre = A ml).

$$\% \text{ Galacturonic acid} \frac{(A + 10) \times 0.9707}{\text{weight of sample}}$$

% degree of esterification =

$$\frac{\% \text{ methoxyl content}}{\% \text{ galacturonic acid content}} \times 625.5$$

The crude de-esterified pectin source may be used in the dried form or when, for example, the user site is conveniently close to the processing station, may be used without drying, when the quantities required will depend on the solids content of the crude pectinaceous material. The orange peel may be subjected to alkaline treatment but we have found that this is not an essential step for the purposes of this invention.

The dried treated peel contains some 20–45% pectin (expressed as galacturonic acid), depending upon the fruit type, degree of maturity, variety, and other factors, and the remaining dry solids comprise hemi-celluloses, araban and other ballast materials. Recent nutritional thinking tends to the view that such cellulosic materials in the quantities contributed to the diet by such inclusion are distinctly beneficial to health. A further advantage of the user of crude materials such as treated peel in accordance with the invention lies in the low calorific value of this material which, together with its previously described properties, signifies its useful application in slimming and diabetic food stuffs where treated peel may be employed to obtain the required water binding properties in place of calorific water binding agents such as starch.

The products may contain from 0.1 to 20% crude pectinaceous material, preferably from 0.1 to 10%. When a rigid gel is to be provided substantially entirely by the crude pectinaceous material the preferred concentration is from 1 to 10% of the total weight of the product.

In particular formed structures can be readily manufactured, at low pH values between 2.5 and 5.0, which have a firm resilient texture at concentrations of the crude pectin sources which are at a similar level to those required when using the purified materials. Thus a similar functional effect can be obtained at lower levels of pectin, without the need for expensive purification manufacturing processes and consequently at much lower ingredient cost. Expressed alternatively, at similar levels of pectin, the crude pectinaceous material gives significantly superior products to the purified materials.

The structures which can be formed include those resembling meats, fatty tissue, and fruits. The resultant texture depends upon the amount of pectinaceous material, the type of extractant and the amount of available calcium salts used.

The formation of simulated fruit from fruit pulp and alginate or conventional "low methoxy pectin" with a source of calcium and an acid release agent has recently been described in British Spec. No. 1,369,198. We believe, however, that we are the first to discover that crude pectinaceous materials of D.E. below 20% have outstanding advantages of cost and performance over extracted or purified pectins, as will be demonstrated below.

Since the crude pectinaceous material invariably contains calcium ions it is not always necessary to add calcium salts to achieve the desired thickening or binding effect. We have found that a large number of salts, for example potassium carbonate or sodium citrate, are capable of sufficiently effecting the dissociation of the pectin, particularly when heated, to develop its functional properties. However certain salts such as sodium tripolyphosphate are especially effective in both effecting the dissociation of the pectate from its crude pectinaceous source and also are capable of delaying the interaction of the pectate with calcium ions to allow mixing and moulding processes to occur before the binding reactions occur. This is particularly important in acid systems where the ionic reactions between the pectate and calcium ions generally occur so rapidly that thorough mixing is difficult to achieve before the setting processes take place. The crude pectinaceous sources appear to give a greater delay tolerance compared with purified sources particularly when hot. At very low pH values, i.e. below 3.5 the setting process no doubt involves both the formation of calcium pectate and the precipitation of pectic acid.

The levels of crude pectinaceous sources used in forming set meat structures will be in the region of 0.1–10%, preferred level 0.5–4.0%. The preferred dissociation salts to be used are complex phosphates in the ratio of 0.2–2, especially 0.5–1, parts of salt, such as sodium tripolyphosphate or sodium hexametaphosphate, to 1 part of pectinaceous source. Calcium or other acceptable alkaline earth metal salts may be added to the formulation in which case a sparingly soluble salt at neutral pH values is preferred, but alternatively the mixture may be formed in a soluble calcium salt solution. Acidic conditions, which assist the formation of bound calcium-pectate structures can be induced by the addition of citric, tartaric, malic and similar acids, or by the addition of a slowly hydrating glucono δ lactone which gradually reduces the pH value of the product, increases the available calcium content and consequently causes the gradual setting up of the required structure.

Protein foods of pH 2.5 to 5 embodying this invention may contain meaty materials, such as meat, poultry or fish or their offals or by-products, or vegetable proteins, for example soy protein. One group of products of interest contain meat or meat by-products and sufficient humectant to stabilize the product against microbiological spoilage at intermediate moisture level. They preferably contain 0.1 to 10% by weight of treated citrus peel, from 0 to 5% sequestrant, from 15 to 45% moisture, and sufficient water soluble substance as to confer on the product a water activity ($A_w$) of 0.80 to 0.93, the remainder being meaty materials or other nutritional substances or additives. The provision of the necessary amount of water-soluble substances as humectants and antimycotics is well understood in the art. Such compositions of pH 2.5–5 are especially useful for feeding domestic animals, such as cats.

Another type of product is formed meat products, including sausage of pH 2.5–5 prepared by binding together comminuted meats or meat by-products. The preferred formulations contain 40 to 95% meaty materials, 0.1 to 10% treated peel, 0 to 5% calcium salt, 0 to 5% sequestrant and 20 to 50% added water, giving a total moisture content of 50 to 95% or more especially 60 to 90%.

Brawns are another product of pH 2.5–5. The total protein content, which may be meat (including fish or poultry) meat by-products or vegetable protein such as soya protein is preferably from 5 to 30%, the moisture content 50 to 95% and the gel phase contains 0.1 to 10% treated peel, based on the total weight of product, and sequestrant and calcium salt as with the products mentioned above.

Ice lollies benefit from the incorporation of low purity pectin sources, giving an internal structure which prevents the development of large ice-crystals, which affect the mouth feel of the lolly, reduces colour and flavour loss and delays melt-down. Preferred formulations contain 85 to 95% water, 0.1 to 10% treated peel and sequestrant and calcium salt as above, and have a pH in the range 2.5 to 5. Flavour and colour are used at conventional levels.

Formed fruit structures or pie fillings according to the invention, also with a pH of 2.5 to 5, preferably contain from 20 to 80% fruit puree (depending on the degree of fruitiness required), 0.1 to 10% treated peel and sequestrant and calcium salt as before.

Among milk products, i.e. products in which the predominant solid contents are milk solids, yoghurts may have pH values falling within the pH 2.5 to 5.0 range but other products such as ice cream or blancmange have pH values more nearly neutral, say up to pH 7.5. Preferred formulations for these products contain 2 to 60% milk solids, more especially about 10%, 0.1 to 5% treated peel and 0 to 3% sequestrant, together with sugar, fat, colouring or other additive, and the balance moisture. Calcium salts are not normally needed with milk products because of the relatively high calcium content of milk, but up to 3% may be added if desired.

The formed structures have been found to be surprisingly resistant to thermal processing such as cooking or autoclaving under acidic conditions and appear to have greater thermal resistance than structures formed with purified pectin or other acidic polysaccharide sources. Although the presence of humectants such as sucrose, polyhydric alcohols does reduce the binding characteristics of the crude protopectin sources they continue to perform better than purified sources under the same conditions. Indeed at levels similar to that of low methoxy pectin amide (an expensive material) the crude protopectin source can be used to produce dietetic jams of improved rigidity.

It is worth noting that the purified ionic polysaccharides used hitherto, e.g. purified sodium polypectate which has a pectin content, expressed as galacturonic acid, of some 65-70%, are extremely expensive, i.e. are about ten times the cost of the crude protopectin sources, e.g. treated orange peel with a pectin content of 25-30% expressed as galacturonic acid. In instances where other purified acidic polysaccharides such as sodium alginate may be used their cost is of the same order as purified polypectate.

A further application of these protopectin sources lies in the synergistic interaction between milk and other dairy products and the crude protopectin bearing sources to produce a range of novel desserts, custards, yoghurts, cheeses and ice cream where, depending upon the concentration of treated peel and sequestrant, a wide range of textures and degree of emulsification and stabilisation can be obtained. It is possible that the demethoxylated pectin in the treated peel is reacting with both the calcium in the milk and the milk proteins to produce these effects and that the hemicelluloses and non-pectin materials in the treated peel act as an effective moisture binding agent conferring further stability on the food product. The reaction with milk may take place after sterilisation of a can of a neutral treated peel syrup to provide novel milk desserts.

The following are examples of the preparation of treated citrus peel for use in this invention, prepared with and without the use of alkali.

EXAMPLE 1

Preparation of Treated Peel

10 Kg of South African Navel oranges were halved, squeezed to remove the juice and then passed through a mincer fitted with a 3/16-inch plate. The ground peel was washed with tap water, pressed, slurried in water and sufficient anhydrous sodium carbonate was added with mixing to raise the pH to 9.0. The slurry was allowed to stand for 18 hours and was then pressed, washed, pressed and roller dried. The roller dried flakes were ground into a fine powder. The yield was 520 g.

EXAMPLE 2

Comparison of the gel strengths of treated peel and sodium polypectate

A comparison was made of the strengths of a gel containing 1% treated peel (30% galacturonic acid) with that of a gel containing 0.46% sodium polypectate (65% galacturonic acid) i.e. gels containing the same pectin content. This was carried out as follows:

Treated Peel Gel Preparation

882 G. of distilled water was heated to 90° C. 3.3 G. of sodium tripolyphosphate was added with stirring, followed by 10 g. treated peel (prepared as described in Example 1) and mixed using a Silverson mixer for 5 minutes at 90° C. 5 G. of dicalcium phosphate was added and mixed for one minute. 8 drops of an antifoam agent was added and the solution was evacuated in a vacuum chamber to ensure that no air was present in the solution. This solution was transferred to an open necked 3 liter flask and a solution of 15 g. glucono delta lactone in 85 g. water was stirred in for 15 seconds.

This solution was poured into square perspex jelly boxes and covered with polythene cover slips.

Sodium Polypectate Gel Preparation

The preparation of the sodium polypectate gels was carried out in an identical manner to that described above except that the treated peel was replaced by 4.6 g. sodium polypectate (Sigma Chemical Co.).

Gel Testing

After standing for 5 hours at room temperature, two of the treated peel gels and two of the sodium polypectate gels were tested using the FIRA jelly tester. The force in grams required to turn the gel tester paddle through 90°, i.e. to rupture the gel was recorded.

Results.

| Sodium Polypectate | | | Treated Peel | | |
|---|---|---|---|---|---|
| Gel 1 | Gel 2 | Average | Gel 1 | Gel 2 | Average |
| 165 g. | 178 g. | 171 g. | 212 g. | 215 g. | 214 g. |

Thus the treated peel gels (containing the same pectin level) were 25% higher in break strength value than the purified sodium polypectate gels. Subjectively the treated peel gels were significantly tougher and firmer than the sodium polypectate gels. The pH of both sets of gels was 4.1.

The following are examples of the use of low purity pectin sources in accordance with this invention. Examples 3 to 12 illustrate the formation of low pH products and Examples 13 to 15 that of milk-derived products. All percentages are by weight unless the context otherwise requires.

EXAMPLE 3

Use in low pH semi-moist pet food

The treated peel described in Example 1 was used in the following formulation:

| | |
|---|---|
| Fermented oily fish | 37.3% |
| English flour | 38.8% |
| Butylated hydroxyanisole | 0.008% |
| Dyestuff | 0.022% |
| Propylene glycol | 4.34% |
| Sodium chloride | 0.93% |
| Solution containing 5% treated peel + 1% sodium tripolyphosphate | 18.6% |

The ingredients, other than the treated peel solution, were mixed in a bowl mixer using a dough hook. When the mix had developed into a sticky dough, the treated peel solution was mixed in and the mix was extruded through a mincer fitted with a 1 cm plate. The resultant sausages were baked at 160° C. for 14 minutes and allowed to cool before being cut into 1 cm long pieces.

The product was firm and rubbery, possessing a good resilient texture. It had a pH of 4.35, a water activity ($A_w$) of 0.86 and was consequently biologically stable.

In the absence of treated peel solution, up to 10% vital wheat gluten had to be added in order to obtain a similar texture.

EXAMPLE 4

Use in ice lollies.

Formulation:

| | |
|---|---|
| Sucrose | 12% |
| Citric acid | 0.2% |
| Glucose | 3.2% |
| Concentrated orange juice | 50.0% |
| Water | 34.0% |
| Treated peel | 0.4% |
| Sodium hexametaphosphate | 0.2% |

Preparation

A solution of the treated peel was prepared by dissolving the sodium hexametaphosphate, heating it to 80° C. to 90° C. and adding the treated peel with stirring. The remaining ingredients were added to the hot solution with stirring and the resulting solution was filled into lolly moulds. These were placed in a blast freezer at −30° C. for 2 hours and then the frozen lollies were transferred into a chest freezer at −12° C. and left overnight.

The melt-down characteristics of this product were compared with a similar formulation which did not contain treated peel, by placing the ice lollies in a filter funnel at room temperature resting in a 10 ml measuring cylinder. The time for the first drip to enter the cylinder was noted. The drip time for the control ice lolly was 1.5 minutes whereas for the lolly containing treated peel it was 10.5 minutes to the drip point.

The products were also organoleptically assessed for texture and colour retention. Whereas the control had a rough mouthfeel associated with the presence of large ice crystals, the treated peel lolly had a smooth consistency due to the presence of a fine ice crystal structure. During consumption it was found that the control lolly rapidly lost colour and flavour whereas the treated peel lolly resisted a colour and flavour loss until the lolly had been completely consumed. The pH of the treated peel lolly was 3.5.

EXAMPLE 5

Formed fruit pieces

Formulation:

| Reconstituted dried apricot | 50 g |
|---|---|
| Water | 50 g |
| Sodium hexametaphosphate | 1.0 g |
| Treated peel | 2.0 g |
| Calcium sulphate dihydrate | 1.0 g |

Process

Reconstituted apricot was prepared by soaking dried apricot overnight in tap water and mincing the rehydrated apricots through a 2 mm plate. The water was heated to 80° C. and the sodium hexametaphosphate was added with stirring. This was followed by the addition of treated peel, calcium sulphate and reconstituted apricot whilst continually stirring:

The mixture was poured into a mould within a period of ten minutes and allowed to cool to room temperature over a period of 2 hours. The set structure was found to closely resemble the shape of the mould and to have a firm texture and a pH value of 4.0.

The apricot shaped pieces were baked in an open pastry case at 375° F. for 25 minutes with a commercial syrup, and after cooling to room temperature it was found that the pieces had not altered in shape or texture and on consumption closely resembled the mouthfeel of natural fruit.

EXAMPLE 6

Brawn-like pet food

Stage one:

550 g of cooked minced fatty muscle meat was heated by indirect steam to 85° C. and stirred in Kenwood mixer for one minute.

Stage two:

A gravy was prepared by dissolving 1.67 parts of sodium tripolyphosphate in 93.3 parts of water and heating to 90° C. 5 Parts of treated peel was added with stirring.

400 G of this gravy was added to the meat and mixed for one minute.

Stage three:

A solution of 10 g of citric acid in 40 g water was added to the meat and gravy mixture and stirred in a Kenwood mixer for ½ minute. The mixture was poured into foil trays and placed in a refrigerator.

After cooling to 10° C. the product was found to have a firm rigid texture and on removal from the tray a glossy surface appearance resembling natural brawns. The product had a pH of 4.6.

EXAMPLE 7

As Example 1 except that 8 g of tartaric acid replaced 10 g of citric acid. The final product was similar to Example 5 except that it had a slightly less elastic texture and a pH value of 4.3.

EXAMPLE 8

Formed apple pieces

| Formulation: | | |
|---|---|---|
| Mix A - | Apple puree | 99.0% |
| | Citric acid | 1.0% |
| Mix B - | Treated peel | 4.0% |
| | Sodium tripolyphosphate | 1.0% |
| | Water | 94.5% |
| | Dicalcium phosphate | 0.5% |

Process

Mix B was prepared by heating to boil all the ingredients except for the dicalcium phosphate which was added at the boiling point. Mix B was added in a 1:1 ratio to mix A, thoroughly mixed, poured into a mould and allowed to set. Setting occurred in approximately 5–15 minutes.

After cooling to room temperature the product was found to have a firm, tough texture, very similar in eating characteristics to natural apple tissue.

When the process was repeated, replacing the treated peel in Mix B with 2% sodium polypectate (Sigma Chemicals) and correspondingly more water, it was found that on mixing A and B together, setting up took place more quickly than with treated peel and that the resulting product had a softer and weaker texture than that obtained with treated peel. It should be noted that this product contained slightly more pectin than the treated peel product but was inferior in texture.

The process was repeated a third time replacing the treated peel in mix B with 2% sodium alginate (Alginate Industries Ltd.) and correspondingly more water. The setting process took a similar period of time as the treated peel but the product had a softer more elastic texture, a gummy mouthfeel and a slight seaweed aroma compared with that of the treated peel product. All three products had a pH of 3.7.

The three products were cut into pieces and heat processed by canning in water and autoclaving for 46 minutes at 260° F. After cooling to room temperature it was found that the treated peel product had a firmer texture than either the sodium polypectate or sodium alginate products.

EXAMPLE 9

Formed meat structures

| Mix A - | Liver | 99.0% |
|---|---|---|
| | Citric acid | 1.0% |
| Mix B - | Treated peel | 4.0% |
| | Sodium tripolyphosphate | 1.0% |
| | Water | 94.0% |
| | Dicalcium phosphate | 1.0% |

Process

Mix A was prepared by finely mincing the liver and citric acid together in a Mincemaster. Mix B was prepared by heating all the ingredients together to the boiling point with vigorous stirring.

Mixes A and B were combined in a ratio of 1:1 by vigorous stirring over a period of about 1 minute and then poured into a mould. The mix set over a period of 15–25 minutes and after cooking to room temperature was found to have a firm, tough, meat-like texture.

The process was repeated, replacing the treated peel in Mix B with 2% sodium polypectate and correspondingly more water. The mix set over a period of 15–25 minutes and after cooling to room temperature was found to have a much softer, weaker and stickier texture than the treated peel product.

The process was repeated a third time, replacing the treated peel in Mix B with 2% sodium alginate and correspondingly more water. The mix set over a period of 15–25 minutes and after cooling to room temperature was found to have a much softer, more elastic and stickier texture than the treated peel product. All three products had a pH of 4.9.

The three products were cut into pieces and autoclaved in water in handy cans for 46 minutes at 260° F.

After cooling it was found that whilst all three products had retained their shape and identityt, the treated peel product had a much firmer, tougher texture than either the sodium polypectate or the sodium alginate product, even though the treated peel product had a lower acidic polysaccharide level.

EXAMPLE 10

Formed meat was prepared as in Example 11 except that the sodium tripolyphosphate was replaced by trisodium citrate.

It was found that the setting reaction was faster than with sodium tripolyphosphate and the product was not as firm, both before and after autoclaving.

EXAMPLE 11

Use in dietetic jam manufacture

| Formulation: | |
|---|---|
| Strawberries | 600 g |
| Sugar | 360 g |
| Citric acid | 7.7 g |
| Treated peel | 20 g |
| Trisodium citrate | 7.2 g |

Process

The strawberries, sugar and citric acid were boiled together until the weight loss was 400 g. A solution of the treated peel and citrate in 400 g water was prepared by heating to the boil with stirring and added to the strawberry mix at the boiling point. The mixture was stirred briskly, poured into jars and allowed to cool to room temperature. The pH was 4.2. The product was found to have set to a firm gel with a smooth spreadable texture.

The process was repeated, replacing the treated peel with 12 g of low methoxy pectin amide (Bulmers Ltd.) and 6 g of calcium chloride (the calcium chloride being added as a solution after the low methoxy pectin amide had been mixed in).

After cooling to room temperature the product was found to be softer and stickier than the treated peel product, even though it contained more pectin (expressed as galacturonic acid).

EXAMPLE 12

Use as a lemon meringue pie filling

| Formulation: | |
|---|---|
| Water | 89.7% |
| Sugar | 6.9% |
| Guar gum | 0.6% |
| Sodium tripolyphosphate | 0.6% |
| Lemon essence | 0.6% |
| Treated peel | 1.0% |
| Dicalcium phosphate | 0.1% |
| Citric acid | 0.5% |

The water, sodium tripolyphosphate, and treated peel were heated to the boiling point with vigorous stirring and the guar gum added.

The lemon essence, sugar, dicalcium phosphate and citric acid were then added with stirring and the mixture was poured into pastry cases and baked for 30 minutes at 200° F.

After cooling the pie filling was found to have the texture of a set gel. The gel had a better mouthfeel, was more elastic and tougher than a filling prepared to the same formulation and process but using 0.46% sodium polypectate, i.e. which contained the same level of pectin. The pH of both fillings was 4.2.

EXAMPLE 13

Yoghurt

| Formulation: | Parts by weight |
|---|---|
| Milk | 500 |
| Spray dried skimmed milk powder | 20 |
| Sucrose | 15 |
| Starter culture | 10 |
| Treated peel | 10 |
| Sodium tripolyphosphate | 10 |

Process

The milk powder, sucrose, treated peel and sodium tripolyphosphate were dissolved in the milk and pasteurised by heating to 85° C. with continual stirring for 20 minutes.

The solution was cooked to 41° C. and a starter culture containing approximately $10^9$ viable cells/ml of a mixture of *Lactobacillus bulgaricus* and *Streptococcus thermophillus* was mixed in. The solution was poured into small plastic pots.

After incubation at 37° C. for 5–7 hours the pH was found to have fallen to 4.2. The yoghurt was "struck" by rapid chilling over 1 hour to 4° C.

The yoghurt was found to have a stiff cream-like consistency similar to the texture of commercial yoghurts. No separation of whey or serum occurred on chilled storage for up to 2 weeks.

EXAMPLE 14

Use in ice cream

| Formulation: | |
|---|---|
| Fat (R.D. palm oil) | 60 g |
| Sugar | 140 g |

-continued

| Formulation: | |
|---|---|
| Spray dried milk powder | 110 g |
| Glycerol monostearate | 5 g |
| Sodium tripolyphosphate | 5 g |
| Water | 675 g |
| Treated peel | 2 g |
| Flavouring | 1 g |

The mix was prepared by dissolving the sodium tripolyphosphate in the water with stirring and heating to about 70° C. The milk powder and sugar was mixed and added using a Silverson emulsifier. The glycerol monostearate and fat were then emulsified in the mix with vigorous stirring and finally the treated peel was added.

The mix was held, with vigorous emulsification at a temperature of 73° C. for 10 minutes to effect pasteurisation. After rapid cooling the mix was aged for 16 hours at 3° C. The viscosity was then assessed with a "Viscotester" at 20° C.

The experiment was repeated with a mix containing no peel and 5 g of peel and the following resulted obtained:

| Treated peel content | 0 g | 2 g | 5 g |
|---|---|---|---|
| Viscosity (poise) | 1.1 | 11.0 | 30.0 |

It was observed that the mixes containing the peel were highly thixotropic. On vigorous stirring the viscosity dropped rapidly to that of the control. This affords ease of handling of the mix during the processing operations.

A further mix was prepared as described in the formulation except that it was not aged but cooled down to 25° C. immediately after preparation. Soft ice cream was prepared using a General Cold machine. The product had about 80% over-run and was extruded at −4.5° C. into small plastic containers of about 100 ml capacity.

The ice cream was hardened in a blast freezer at −26° C. On removal after one week, the product was placed on a wire gauze at room temperature and its rate of meltdown measured and compared with a control containing no treated peel.

| Ml meltdown | Product containing 2 g peel Time (minutes) | Control Product Time (minutes) |
|---|---|---|
| 1 ml | 20 | 9 |
| 2 ml | 22 | 13 |
| 3 ml | 24 | 14 |
| 5 ml | 26 | 17 |

The product containing the treated peel had a firmer texture at eating temperature than the control, and its surface had a creamy, smooth texture whereas the surface of the control was coarse and watery.

The meltdown from the peel product had an extremely stable foam compared with the control.

Example 15

Use in blancmange-type desserts

| Formulation: | |
|---|---|
| Milk | 93.5% |
| Treated peel | 1.9% |
| Guar gum | 0.5% |
| Sodium tripolyphosphate | 0.4% |
| Sugar | 3.7% |

-continued

| Formulation: | |
|---|---|
| Coffee flavour | to taste |

All the ingredients, except the treated peel, were added to the milk with stirring. The mixture was then heated to just below the boiling point and treated peel prepared as described in Example 1 was added slowly with vigorous stirring. After the peel had dispersed the mixture was poured into moulds and allowed to cool.

After cooling to room temperature the product was found to readily demould from the container and consist of a firm milk gel with pleasant mouthfeel and taste.

By altering the level of sodium tripolyphosphate milk gels with a wide range of textural characteristics were obtained.

The process was repeated replacing the 1.9% treated peel with 0.87% sodium polypectate, the difference being made up with milk. The sodium polypectate product was found after cooling to room temperature to be softer and weaker than that prepared from treated peel even though both contained similar amounts of pectin.

We claim:

1. A food product comprising a comminuted meaty or vegetable protein bonded in a gel, said gel being formed of an acidic aqueous phase having a low pH of 2.5 or above gelled by a crude pectinaceous material in an amount of from 0.1 to 20% of the total weight of the product de-esterified to a degree of esterification below 20%, the product having from 0 to 5% of a suitable calcium salt to effect bonding and 0 to 5% sequestrant by weight.

2. A milk based food product comprising by weight: from 2 to 60% milk solids, from 0.1 to 5% crude pectinaceous material and having a pH value in the range of 5.0 to 7.5, the pectin content of said pectinaceous material having been de-esterified to a degree of esterification below 20%, a suitable calcium salt from 0 to about 5% to effect stabilization or thickening, and from 0 to 5% sequestrant; the balance comprising sugar, fat, and moisture; said milk solids being dissolved or emulsified in said product and said pectinaceous material in combination with the available calcium in the product stabilizing or thickening said product.

3. A food product according to claim 1 wherein the moisture content of the product is between 15 and 45% and the product further contains a humactant sufficient to effect a water activity of 0.80 to 0.93.

4. A solid coherent food product comprising pieces or particles of solid foodstuff supplying a protein content of 5 to 30% animal or vegetable protein by weight of said product, 0.1 to 10% by weight crude pectinaceous material having a pectin content de-esterified to a degree of esterification below 20%, a suitable calcium salt up to about 5% to effect bonding, 0 to 5% sequestrant, and from 50 to 95% moisture said product being acidic having a low pH of 2.5 or above and said pectinaceous material in combination with the available calcium in said product and at least part of said moisture forming a heat resistant gel embedding or bonding together said pieces or particles of foodstuff.

5. A calcium containing ice food product comprising from 0.1 to 10% by weight crude pectinaceous material having a pectin content de-esterified to a degree of esterification below 20%, 0 to 5% sequestrant, flavouring and water; said product having a pH in the range 2.5 to 7.5 and said pectinaceous material in combination with the available calcium in said product affording a structure in said product inhibiting the enlargement of ice crystals.

6. An ice food product according to claim 5 containing from 85 to 95% water and having a pH in the range of 2.5 to 5, the calcium contained in said product comprising an added calcium salt up to about 5%.

7. An ice food product according to claim 5 containing at least 2% milk solids and having a pH in the range from 5 to 7.5.

8. A food product comprising from 20 to 80% by weight fruit puree bonded in a gel, said gel being formed of an acidic aqueous phase having a low pH of 2.5 or above gelled by a crude pectinaceous material in an amount of from 0.1 to 20% of the total weight of the product de-esterified to a degree of esterifiction below 20%, the product having from 0 to 5% of a suitable calcium salt to effect bonding and 0 to 5% sequestrant by weight.

* * * * *

UNITED STATES PATENT AND TRADEMARK OFFICE
CERTIFICATE OF CORRECTION

PATENT NO. : 4,143,172
DATED : March 6, 1979
INVENTOR(S) : JOHN R. MITCHELL, KEITH BUCKLEY and IAN E. BURROWS It is certified that error appears in the above-identified patent and that said Letters Patent are hereby corrected as shown below:

On the first page, third line from the bottom in the left-hand column, the name "Clavert" should be--Calvert--.

Column 1, line 4, after "relates" insert--to--.

Column 3, line 27, a parenthesis mark should be inserted at the beginning of the line--

Column 11, line 28, "identityt" should be changed to--identity--.

Column 13, line 22, "resulted" should be changed to--results--.

Signed and Sealed this

Twenty-sixth Day of February 1980

[SEAL]

Attest:

SIDNEY A. DIAMOND

Attesting Officer     Commissioner of Patents and Trademarks